United States Patent [19]
Defrasne

[11] Patent Number: 5,286,957
[45] Date of Patent: Feb. 15, 1994

[54] SMART CARD READER

[75] Inventor: André Defrasne, Pontarlier, France

[73] Assignee: Alcatel Cit, Paris, France

[21] Appl. No.: 872,327

[22] Filed: Apr. 23, 1992

[30] Foreign Application Priority Data

Apr. 26, 1991 [FR] France ................. 91 05192

[51] Int. Cl.⁵ .............................................. G06K 7/06
[52] U.S. Cl. ......................................... 235/441; 235/482
[58] Field of Search ............. 235/441, 482; 439/137, 439/138, 260, 267, 630

[56] References Cited

U.S. PATENT DOCUMENTS

| | | | |
|---|---|---|---|
| 4,171,737 | 10/1979 | McLaughlin | 194/4 R |
| 4,514,623 | 4/1985 | Baus et al. | 235/482 |
| 4,592,608 | 6/1986 | Ohtsuka et al. | 439/260 |
| 4,839,509 | 6/1989 | Yasuma et al. | 439/260 |
| 4,857,005 | 8/1989 | Kikuchi et al. | 439/137 |
| 4,873,425 | 10/1989 | Langlais et al. | 235/482 |
| 4,926,034 | 5/1990 | Banjo et al. | 439/137 |
| 5,066,241 | 11/1991 | Hills | 439/260 |
| 5,091,618 | 2/1992 | Takahashi | 439/260 |
| 5,161,992 | 11/1992 | Birch | 439/267 |
| 5,179,504 | 1/1993 | Kitahara | 439/137 |

FOREIGN PATENT DOCUMENTS

| | | |
|---|---|---|
| 0218504 | 4/1987 | European Pat. Off. . |
| 8908801 | 10/1989 | Fed. Rep. of Germany . |
| 2552252 | 3/1985 | France . |

Primary Examiner—E. Rollins Cross
Assistant Examiner—Erick Solis
Attorney, Agent, or Firm—Sughrue, Mion, Zinn, Macpeak & Seas

[57] ABSTRACT

A smart card reader comprises contact members and card guiding and positioning devices including a guide corridor and an end of travel positioning abutment. The combination establishes electrical connections between the contact members and conductive lands of a card inserted into the reader until it bears against the end of travel positioning abutment. The end of travel positioning abutment is retractable. The card guide corridor is open at its inner end to the rear of the retractable abutment.

10 Claims, 4 Drawing Sheets

SMART CARD READER

BACKGROUND OF THE INVENTION

1. Field of the Invention

The present invention concerns a smart card reader and in particular a smart card reader provided with mechanical means for applying pressure between a card inserted into the reader and the read contacts.

2. Description of the Prior Art

French patent application No 87 15739 filed Nov. 13, 1987 describes smart card readers in general and a smart card contact frame in particular. This document discloses that a smart card reader comprises card guide or positioning means including a corridor to guide said card, optional means to verify that a card is present in the reader in the correct position to be read and contact members which make electrical connections to conductive lands on the smart card through which are set up circuits used by the device incorporating the smart card reader. The contact frame is a unitary construction element implementing the stated functions. It ensures that the required contact pressure is always achieved when a smart card is inserted despite manufacturing tolerances and flexing of the contact members.

This type of smart card reader is susceptible to damage by vandalism preventing its further operation.

One of the most common acts of vandalism is to insert various kinds of foreign body into the card guide corridor, for example a cut portion of a card whose length is less than the length of said corridor.

In this case users are prevented from using the card reader because the cut portion of card cannot be removed from the guide corridor. This requires the attention of a maintenance team and prevents operation of said reader for a non-negligible time.

Although the entry slot of the card guide corridor is generally made as small as possible, a person intent on vandalism can insert into it an object such as a metal rod, hook, nailfile, etc which can be manipulated from the outside so as to hook onto the contact members and damage them irreversibly, so rendering the reader inoperative.

SUMMARY OF THE INVENTION

An object of the invention is to alleviate such drawbacks by preventing this kind of vandalism. To this end it proposes a smart card reader comprising contact members, card guiding and positioning means including a guide corridor and an end of travel positioning abutment, the combination being adapted to establish electrical connections between said contact members and conductive lands of a card inserted into the reader until it bears against said end of travel positioning abutment, characterized in that the end of travel positioning aubutment is retractable and in that the card guide corridor is open at its inner end to the rear of said retractable abutment.

The retractable abutment is advantageously an abutment which retracts when the force exerted on it is greater than a predetermined value. The abutment is part of the cover of said reader. It is disposed at the end of a mobile arm whose inside surface includes a central rib. It is further provided with a bearing surface inclined at approximately 12° against which the card inserted normally into the reader is stopped but which causes retraction of the abutment if abnormally high pressure is applied to it.

The cover also includes a fixed rib beside the abutment to hold the card flat so that it is unable to raise the abutment even if it is curved. The rib and the abutment may advantageously be molded in one piece with the cover.

Foreign bodies inserted accidentally or deliberately into the card guide corridor can therefore be ejected towards the interior of the device incorporating a reader in accordance with the invention by the user himself applying pressure with his card. The retractable abutment is advantageously an abutment which is retracted when the force exerted on it exceeds a predetermined value; the end of travel abutment enables correct positioning of the conductive lands on the card relative to the contact members.

In an advantageous embodiment the parts of the contact members which project into the guide corridor incorporate flanges which may extend as far as the orifice provided in the reader to enable retraction of the contact members.

These flanges have a slope such that any object inserted into the guide corridor and pressing on a contact member at any point pushes the latter out of the corridor, without risk of damage through lateral pressure on the contact member.

The features and advantages of the invention will emerge from the following description given by way of non-limiting example with reference to the appended drawings.

BRIEF DESCRIPTION OF THE DRAWINGS

FIGS. 8 and 9 show a top view and a partial cross-section view of the frame of said reader in a first embodiment; FIG. 10 is a view in cross-section of a contact member of said frame; FIG. 11 shows a partial cross-section view of the frame of said reader in a second embodiment; FIG. 12 is a view in cross-section of a contact member of said frame.

DETAILED DESCRIPTION OF THE INVENTION

Figure 2:
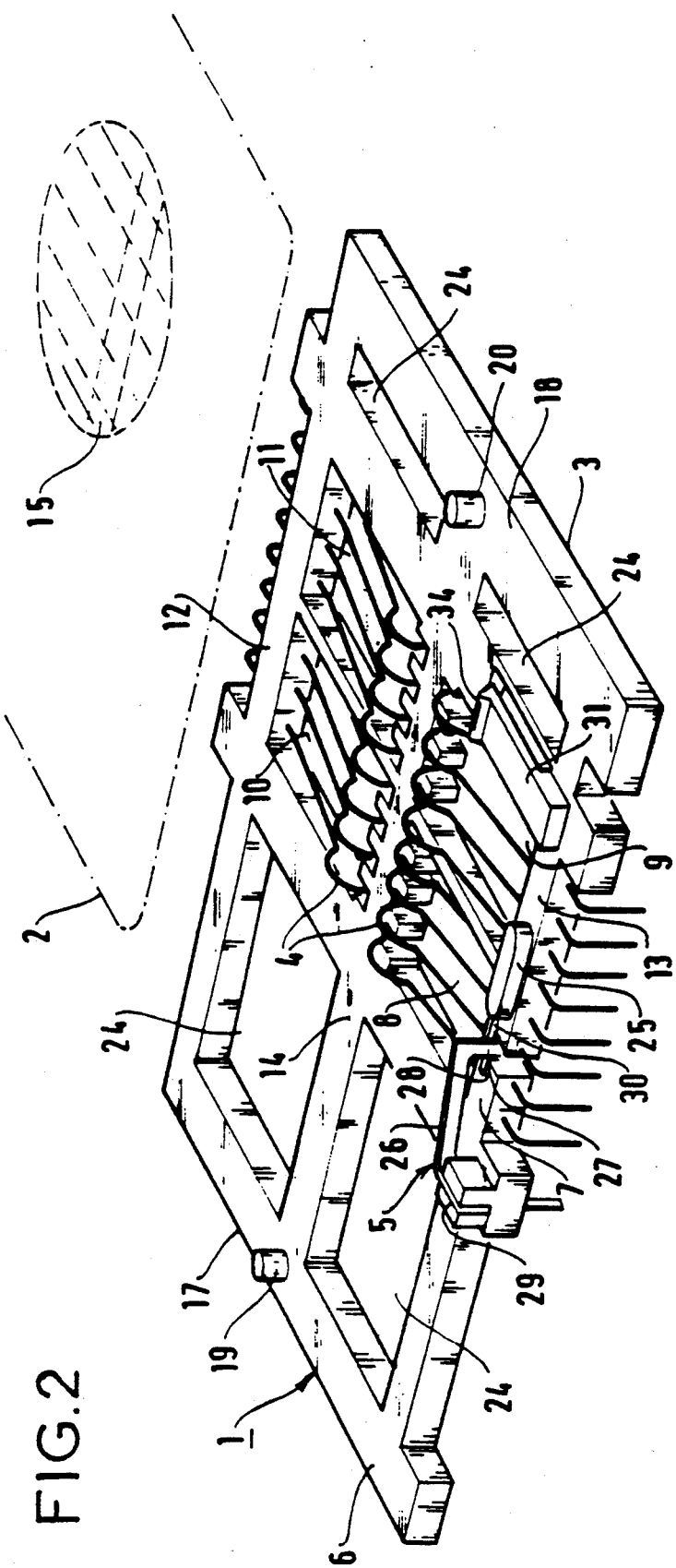

FIG. 2 is a perspective view showing a contact frame 1 of a prior art smart card reader with a smart card 2 in the insertion position. For the purposes of this description these two items are shown upside down as compared with their natural position in which the card is offered up with its contact area on the top and the contact frame 1 is located above the card and faces towards it. The frame essentially comprises an insulative molded material part 3 which simultaneously supports contact members 4 which make the connections to the microchip in the card 2, supports an end of travel contact 5 indicating that a card is present in the reader and is in the correct position to be read and supports (or constitutes) slideways 6 which guide the card and lead it into the correct position shown.

To this end the contract frame 1 comprises an inner frame 7 made up of parts of the frame 1 delimiting connection windows 8, 9, 10, 11. The contact members 4 extend into these windows from bars 12, 13 in which they are embedded. The contact members 4 are profiled and project above the plane 14 of the surface of the frame 1. They must come into contact with the contact lands of the connection area 15 of the card 1 when the latter is correctly inserted in the smart card reader. The inner frame 7 is extended by two flanges 17, 18 which end on the side away from the inner frame 7 in slideway supports 6 which are simply flat surfaces provided with at least one centering stud 19, 20.

Figure 1:
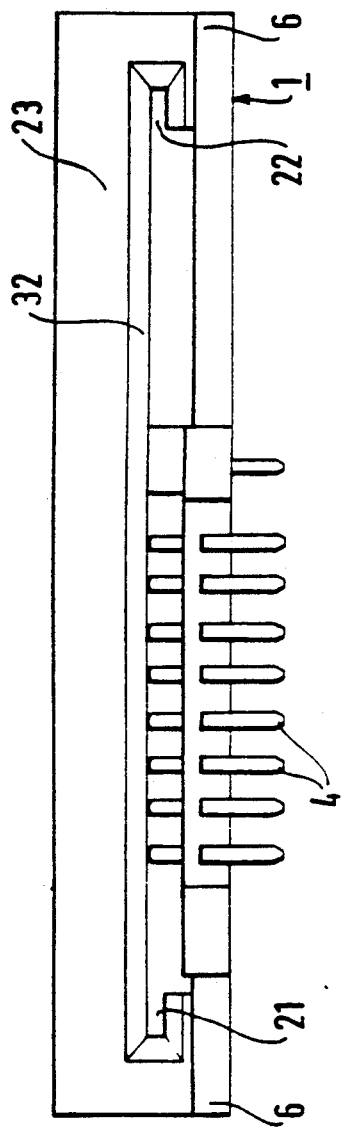
FIGS. 1 and 2 respectively show an end view of a contact frame for a prior art smart card reader to which a cover is fitted to form the card guide corridor and a perspective view of this frame.

FIG. 1 is an end view of the frame 1 from FIG. 2. It shows that the slideways 21 and 22 are both formed in a molded insulative material part 23 forming a cover which is mounted on the supports 6 of the frame 1. The part 23 is accurately positioned relative to the frame 1 by the centering studs 19, 20. It guides the card 2, which it holds by the edges. As can be seen in FIG. 2, the flange 18 incorporates apertures 24 to save on materials.

The contact frame 1 also carries the end of travel contact 5 and an end of travel abutment 25. The end of travel contact 5 is a normally closed contact which is opened when, shortly before coming into contact with the end of travel abutment 25, the card actuates the mobile blade 26 by pressing on its end 27, which separates it from the fixed contact blade 28. The two blades are force fitted into slots 29, 30 of the frame 1 which positions them accurately. The abutment 25 positions the card correctly in the smart card reader. A leaf spring 31 is adapted to press the smart card 2 towards the cover 23. This presses it against the side of the slideway opposite the contact members 4 to define accurately its distance from the contact members.

Figure 3:
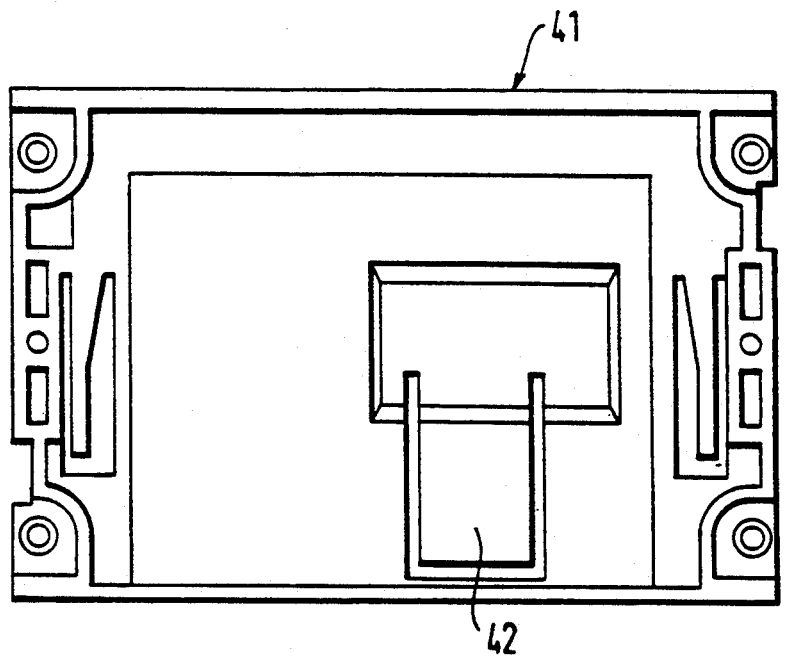
FIGS. 3, 4 and 5 show a top view, an end view and a bottom view of the cover of a smart card reader in accordance with the invention, the cover in FIG. 4 being assembled to the contact frame of a smart card reader in accordance with the invention.
Figure 4:
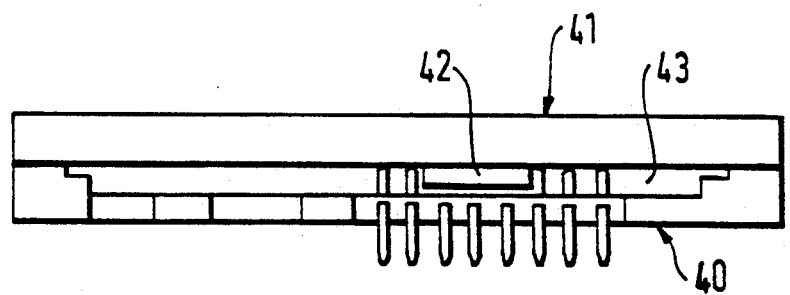
Figure 5:
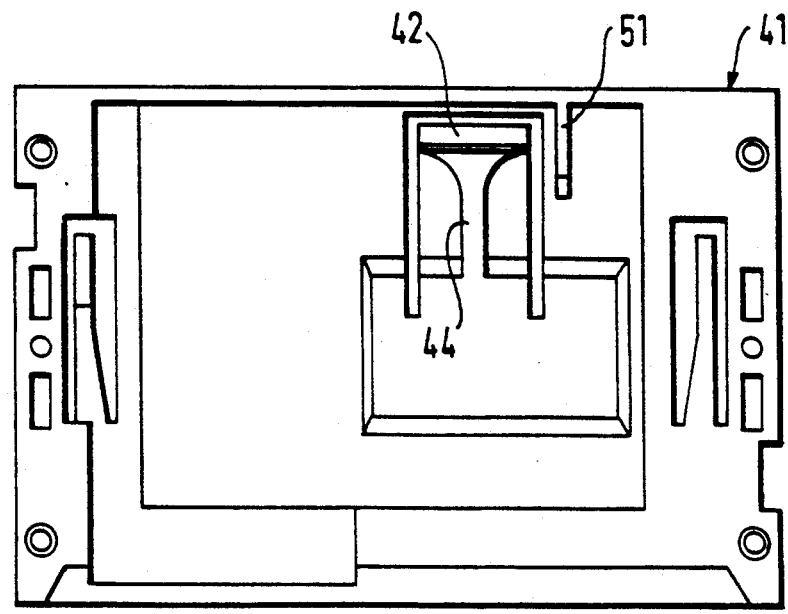

A smart card reader in accordance with the invention comprises a contact frame 40 such as that shown in FIGS. 1 and 2. The cover 41 is as shown in FIGS. 3, 4 and 5, however. It comprises a retractable positioning abutment 42 which normally provides an end of travel abutment for the card to enable electrical connections to be made between the contact members of the frame and the conductive lands on the smart card. However, it is retracted if the force exerted by the card exceeds a predetermined value.

In combination with this abutment, this reader in accordance with the invention comprises a card guide corridor 43 which is open, if possible entirely open, at the end towards the interior of the device in which said reader is provided. This is to enable various foreign bodies inserted accidentally or deliberately to be ejected towards the interior of the device by inserting a smart card.

The abutment is at the end of a mobile arm whose inside surface carries a central rib 44 which has two functions:
to hold the card correctly positioned relative to said abutment;
to stiffen this abutment.

A fixed rib 51 beside the abutment 42 is adapted to press the card against the contact members 45 at the level of said abutment to prevent the card, which may be curved, raising the abutment. If the abutment is even only slightly raised the value of the force F1 to free the opening is reduced.

In an advantageous embodiment the abutment and the rib are molded in one piece with the cover; the critical operating force depends on the stiffness of the plastics material blade forming said abutment 42; this force may be between 70 and 90 Newtons, for example.

Figure 6:
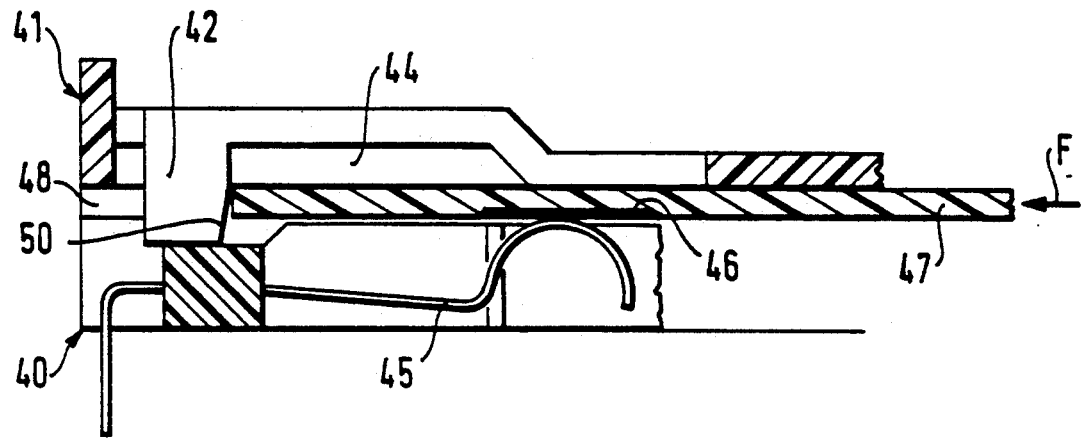
FIGS. 6 and 7 illustrate the advantages of a smart card reader in accordance with the invention.
Figure 7:
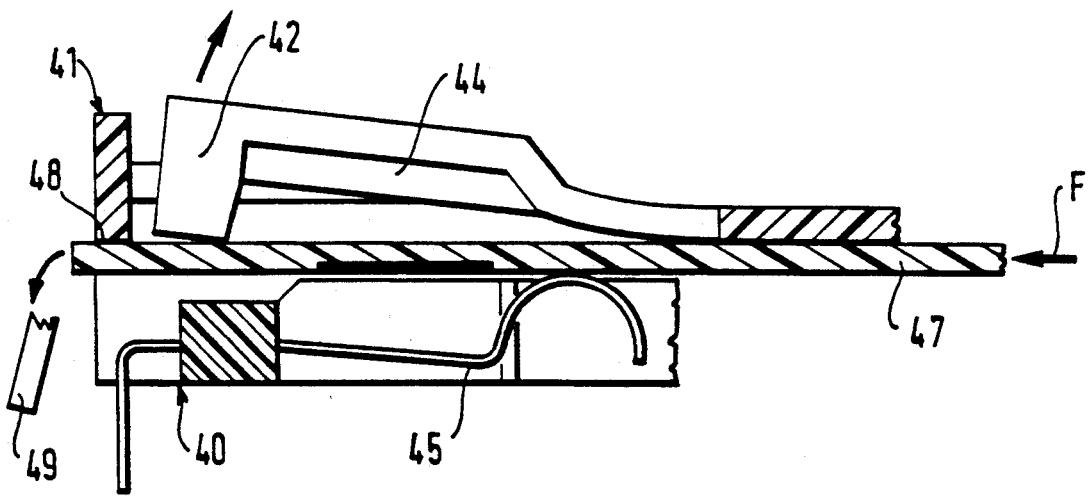
Figure 8:
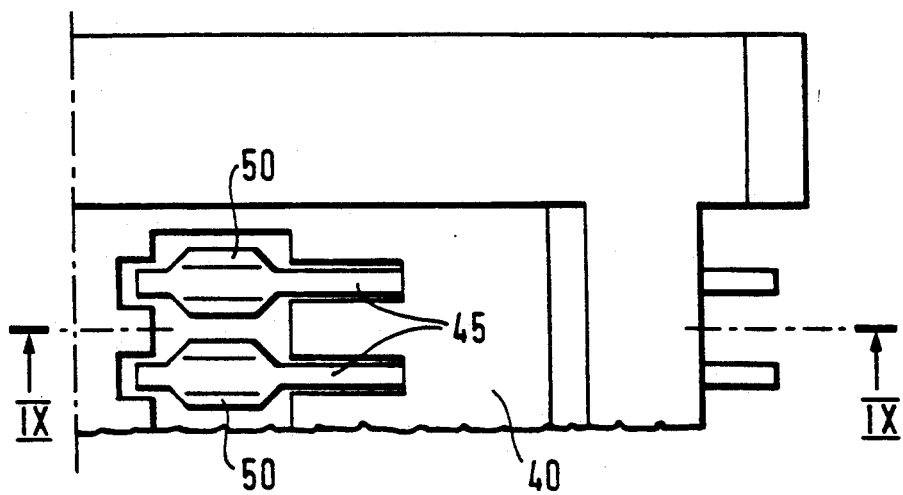
FIGS. 8 through 12 show two advantageous embodiments of a smart card reader in accordance with the invention.

FIGS. 6 and 7 illustrate the advantages of this smart card reader in accordance with the invention.

In FIG. 6 the abutment 42 is exercising its normal function as an end of travel abutment for the card 47 to enable the appropriate electrical connections to be made between the contact members 45 of the frame 40 and the contact lands 46 on said card 47.

In FIG. 7 the abutment 22 is retracted, the force F exerted on the card 47 being greater than a predetermined force F1; this uncovers the opening towards the end 48 of the card guide corridor 47 so that any foreign body 49 can be ejected.

As shown in FIGS. 6 and 7, the abutment 42 has a bearing surface 50 inclined at an angle near 12°, for example, against which a card inserted normally into the reader is stopped but which causes the abutment to be retracted if an abnormally high pressure is applied to it.

FIGS. 8 through 12 show various aspects of two advantageous embodiments of reader in accordance with the invention which make it difficult to damage the contact members 45 of the frame 40.

In these embodiments the parts of the contact members 45 which project into the card guide corridor carry flanges 50. In a first version shown in FIGS. 9 and 10, the contact member 45 being shown in the rest position, the flanges 50 are small which facilitates manufacturing the contact members by stamping them out of a strip metal blank. In this case the passage is virtually completely obstructed to provide effective protection against vandalism. In the second version shown in FIGS. 11 and 12 the flanges extend as far as the orifice formed in the contact frame 40 to enable retraction of the contact members. This prevents an object passing under the contact.

The invention therefore consists in adding to the parts of the contact member which can project into the guide corridor V-shape or rounded lateral flanges 50 which block access to the rear surface of the contacts; the flanges 50 have a slope such that any object in the guide corridor pressing on the contact member at any point pushes the latter out of said corridor without risk of damage due to lateral thrust on the contact member.

Figure 9:
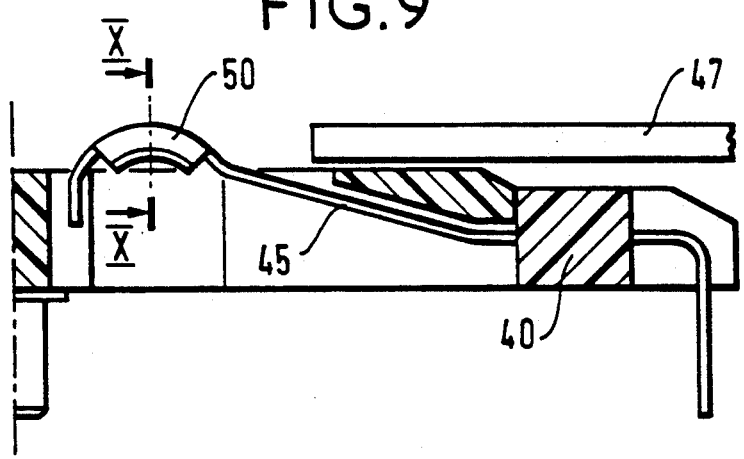
Figure 10:
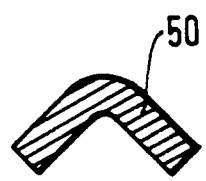
Figure 11:
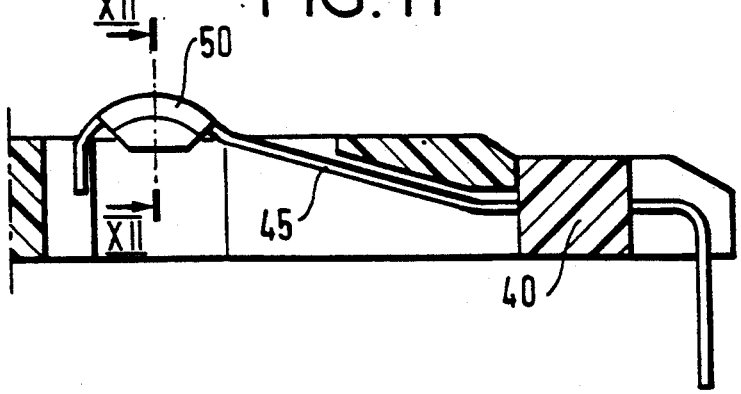
Figure 12:
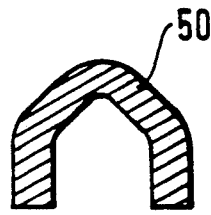

FIG. 9 shows a card 47 through which lateral thrust is exerted on the end of a contact member 45. Because of the 45° inclination (in this example) of the contact flange 50, the latter is retracted due to the component of the force applied to the contact member 45 by the card 47 while the lateral force tending to deform said member is practically equal to the first component and therefore remains low.

It is also possible to obstruct the openings around the contact members to prevent an object inserted into the card guide corridor reaching the rear surface of the contact members 45 except in the part of said contact which may project into said guide corridor.

Of course, the present invention has been described and shown only by way of preferred example and its component parts can be replaced with equivalent parts without this departing from the scope of the invention.

There is claimed:

1. In a smart card reader comprising a contact frame and a cover and having an inner end and an outer end, said outer end being provided with an orifice for insertion of a card to be read, said insertion occurring substantially along a first direction, said reader further comprising contact members, card guiding and positioning means including a card guide corridor defined by said contact frame and said cover, and an end of travel positioning abutment, said card guiding means determining a direction along which the card may be moved, said direction being substantially that of card insertion, said card guiding means establishing electrical connections between said contact members and conductive lands of a card inserted into said reader with a leading edge of said card bearing against said end of travel positioning abutment, the improvement wherein; said reader comprises means for retracting the end of travel positioning abutment along a second direction substantially different from said first direction, and wherein said card guide corridor is open at said inner end of said card reader along said first direction and behind the rear of said retractable abutment for ejecting a foreign body within the card guide corridor upon a predetermined deflection of said end of travel positioning abutment in said second direction.

2. Smart card reader according to claim 1 wherein the retractable abutment is adapted to retract when the force exerted on it is greater than a predetermined value.

3. Smart card reader according to claim 2 wherein the abutment is part of a cover of said reader.

4. Smart card reader according to claim 3 wherein said abutment is at an end of a mobile arm having an inside surface including a central rib adapted to guide an inserted card towards a contact area of said abutment.

5. Smart card reader according to claim 4 wherein said mobile arm of said abutment includes an inclined bearing surface against which a card inserted normally into the reader is stopped but which causes said abutment to retract upon an abnormally high pressure applied thereto.

6. Smart card reader according to claim 5 wherein said bearing surface is inclined at approximately 12°.

7. Smart card reader according to claim 3 wherein the cover includes a fixed rib disposed beside the abutment to press the card against the contact members at the location of the abutment.

8. Smart card reader according to claim 1 wherein a rib and the abutment are molded in one piece with the cover.

9. Smart card reader according to claim 1 wherein parts of said contact members projecting into the guide corridor include flanges.

10. Smart card reader according to claim 9 wherein said reader includes a second orifice to enable said contact members to retract and said flanges extend as far as said second orifice.

* * * * *